United States Patent [19]

Brown et al.

[11] Patent Number: 5,130,148
[45] Date of Patent: Jul. 14, 1992

[54] METHOD OF CHEESE MANUFACTURE

[76] Inventors: C. Gordon Brown, Raskas Foods, Inc. R&D Center, 1318 N. Newstead, St. Louis, Mo. 63113; Charles C. Hunt, Bunge Foods Corp., 3582 McCall Pl., NE., Atlanta, Ga. 30340

[21] Appl. No.: 695,739
[22] Filed: May 6, 1991
[51] Int. Cl.$^5$ ............................................. A23C 9/12
[52] U.S. Cl. ..................................... 426/36; 426/34; 426/40; 426/63; 426/521; 426/523
[58] Field of Search ................ 426/36, 34, 40, 63, 426/518, 521, 523

[56] References Cited

U.S. PATENT DOCUMENTS

| | | | |
|---|---|---|---|
| 3,039,879 | 6/1962 | Vakaleris . | |
| 3,316,098 | 4/1967 | Noznick et al. | 426/40 |
| 3,886,288 | 5/1975 | Rice et al. | 426/36 |
| 4,689,234 | 8/1987 | Ernstrom et al. . | |
| 4,959,229 | 9/1990 | Reddy et al. | 426/40 |
| 5,009,914 | 4/1991 | Serpelloni . | |

OTHER PUBLICATIONS

Singh, et al., "Rennet coagulation of heated milk" influence of pH adjustment before or after heating; *Journal of Dairy Research*, 55,205–215 (1988).

Banks, J. M., et al., "Increasing the yield of cheddar cheese by acidification of milk containing heat-denatured protein", Milchwissenschaft, 42,212–215 (1987).

Marshall, Richard J., "Increasing cheese yields by high heat treatment of milk", *Journal of Dairy Research*, 53, 313–332 (1986).

*Primary Examiner*—R. B. Penland
*Attorney, Agent, or Firm*—Gerstman & Ellis, Ltd.

[57] ABSTRACT

A process for the manufacture of cheese is provided in which milk is acidified, heat treated, cooled and inoculated with an acid producing starter culture. Fermentation is then allowed to proceed until an acid coagulum is formed. The coagulum is cut, cooked to the desired firmness, and further processed by adding cream dressing or press or cheddaring. The initial acidification step will be unnecessary if a supply of milk with a sufficiently low pH is obtained.

13 Claims, No Drawings

METHOD OF CHEESE MANUFACTURE

FIELD OF THE INVENTION

The present invention concerns a novel method of making cheese curd.

BACKGROUND OF THE INVENTION

Several hundred varieties of cheese have been described. Each cheese variety is manufactured from milk using specific methods to give it unique flavor, texture, and functional properties. These methods include milk type, culture strain, cheese moisture content, salt content, etc. By adjusting these parameters, the cheese can be made with the desired properties. The manufacture of cottage cheese curd will be given special treatment here because it is particularly suited to the practice of this invention and will serve as a model system to demonstrate the invention's superiority over existing methods.

A brief description of the manufacture of cottage cheese will follow: Raw milk is delivered to the processing plant, where it is stored in a milk silo. When processing is to begin, the milk is moved through a transfer line to a balance tank. From the balance tank, the milk is sent to the regeneration side of a pasteurizer where it is exposed to one side of a two-sided heat exchanger and warmed to approximately 115°-165° F. The milk is then diverted to a cream separator where the butterfat is removed from the milk in the form of cream. The resultant skim milk is then passed through the heating side of the pasteurizer where it is heated to the desired temperature (about 162° F.) and then into a holding tube where it is held at the temperature for the desired period of time (about 16 sec.). The holding time may be controlled by the flow rate through the pasteurizer. The skim milk passes from the holding tube into the cooling plates of the pasteurizer where the temperature is reduced to approximately 88° F. The skim milk is then moved through a transfer line to the cheese vat. At the beginning, middle, or end, of fill, starter bacterial cultures (*Streptococcus lactis or Streptococcus cremoris*) are added to the milk at pH between 6.50 and 6.80. After inoculation, a coagulator preparation is added to the milk. This preparation is a very dilute proteolytic enzyme extracted from calf stomach or derived from microbial cultures. A small amount (4 to 12 mL/1000 lb. of milk) is all that is necessary because acid development and not enzyme activity is the driving force behind coagulation of the milk that occurs during the next 3 to 6 hours.

During this period the culture converts the mild's lactose into lactic acid via fermentation. This will eventually result in a drop in pH down to 4.70. During the drop in pH, the milk coagulates into a gel. At a pH of approximately 4.70, the coagulum is cut with harps into small cubes so that whey may be expelled. The curd is then allowed to settle t the bottom of the vat without stirring for 30 minutes. The heat is then turned on and the agitators started. The curds and whey are cooked to a temperature between 115° C. and 145° C. The final cook temperature is determined by the curd firmness. During the cook period it may be necessary to add cooking acid (usually phosphoric) to prevent matting of the curd. When the curd reaches the desired firmness, the whey is drawn off and 90° F. water is introduced into the vat. The curd is rinsed for 10 to 15 minutes and the rinse water is drained off. A second rinse at 70° F. follows. The second rinse is followed by a third and final rinse of 45° F. The last rinse is drained and the curd is trenched. The trenched curd is allowed to drain for 30 minutes. Cream dressing is then introduced into the vat until the curd is sufficiently covered. The curd and cream dressing is agitated until adequate dispersion is achieved. The produce is then packaged.

Most cheese milk is heat treated (pasteurized). This is done so that pathogenic organisms which may be present in milk are eliminated. Another reason is to reduce the number of non-pathogenic organisms naturally present in milk so that they are not able to compete with the culture used to make the cheese. Cheese milk is usually pasteurized at the lowest temperature and held for the shortest time possible that will allow accomplishment of these goals (usually 162° F. for 16 sec.). This policy is especially adhered to in the manufacture of cottage cheese curd. Higher temperatures and longer hold times often result in damage to the milk proteins and shifts in the milk's salt balance which can make cheesemaking difficult and unpredictable. For example, U.S. Pat. No. 3,316,098 (Noznick and Bundus, 1967) describes a system using extreme temperature and holding times to effect whey protein incorporation into the curd. Recommended temperatures and holding times were 185° D. for at least 15 minutes; 255° D. for 15 seconds; and 300° F. for one second or less. The invention found little commercial acceptance because the cheese was of poor quality and the temperatures and holding times were too severe.

It has been found, however, that under the proper conditions and if carefully controlled, good quality cheese of high yield can be derived form milk which has undergone severe heat treatment and was coagulated with proteolytic enzyme. U.S. Pat. No. 4,959,229 (Reedy, et al., 1990) teaches that enhanced curd yields may be obtained through a combination of acid and heat. The process consists of a preacidification step followed by pasteurization of the milk at a temperature of 180° F. to 190° F. The heating of the preacidified milk results in complexing of the whey proteins with casein and increased curd yield. A subsequent postacidification is done to condition the proteins so that melt and stretch properties of the curd are improved. This process has been successfully applied to manufacture of mozzarella cheese.

Coagulation of milk for cheesemaking can be accomplished in two different ways, both of which are dependent upon a single chemical mechanism: the formulation of hydrophobic interactions between the among proteins. However, the route that rennet coagulation and acid coagulation take respectively to promote protein hydrophobic interaction are distinct and this distinction is important to the practice of this invention.

Rennet is a proteolytic enzyme preparation of animal or microbial origin whose substrate is casein, the primary protein in milk. In its native state, casein is comfortably suspended in milk and will not coagulate under normal conditions. It is relatively hydrophilic (water loving) in character. When rennet is added to milk the enzyme imposes structural changes on the casein which render it hydrophobic (water hating). This is a very rapid chemical conversion and for this reason rennet coagulation can be accomplished in a matter of minutes. The resultant coagulum is quite firm and resilient and will expel whey rapidly when cut. For this reason, rennet coagulation is sued in the production of low moisture hard cheese such as cheddar and mozzarella.

Although acid coagulation and rennet coagulation of milk are similar in their dependence on the formation of protein hydrophobic interactions, the chemical processes required to develop these bonds are quite different. Whereas rennet coagulation results from enzymatic modification of the structure and behavior of casein, acid coagulation is dependent upon casein reaching its isoelectric point. The process by which the casein reaches its isoelectric point is important to the teaching of this patent.

At the normal pH of milk (6.50–6.80) casein has a net negative electric charge. It is this negative charge that allows casein to be in a stable suspension in milk at milk's normal pH. When a lactic bacterial culture is introduced into the milk and allowed to ferment the lactose to lactic acid, the hydrogen ion concentration will increase and the pH will correspondingly drop eventually to the isoelectric point of casein. The heart of this chemical process is the gradual neutralization of the casein negative electrical charges to the point where negative charges are equalled in number by positive charges. This pH is the isoelectric point and is generally defined as the pH at which a protein has no net charge, has a strong repulsion to water, and an affinity for itself. The isoelectric pH of casein is approximately 4.70.

The process by which acid fermentation of milk causes coagulation is slower than the process of rennet coagulation and the resultant coagulum is more fragile due to less complete aggregation of casein resulting in stability of the curd particles against fusion and moisture loss. When milk undergoes a server heat treatment to increase yield by the complexing of hydrophilic whey proteins with casein incorporating more protein from the milk in the final cheese, the acid-induced coagulation process is hindered. This impediment may be overcome by allowing sufficient time during fermentation for the casein molecules to aggregate into a matrix which will result in a cuttable curd and subsequent yield increase. The reduction or elimination of a postacidification step provides for a greater pH drop to be accomplished by acid fermentation (culture) which extends the casein aggregation time. Therefore, a high heat treatment of preconditioned cheese milk combined with the development of a stable molecular configuration during acid coagulation will allow higher solids recovery, less curd shattering, and higher curd yield.

SUMMARY OF THE INVENTION

According to the present invention, milk is acidified; the acidified milk is heat treated; cooled; and inoculated with an acid producing starter culture. Fermentation is then allowed to proceed over an extended time until an improved acid coagulum containing more solids is formed. The coagulum is cut, cooked to the desired firmness, and further process by adding cream dressing or pressing or cheddaring.

The improvements provided by this invention over conventional cheesemaking methods may be achieved without the initial acidification step if a supply of milk with a sufficiently low pH is obtained.

A more detailed explanation of the invention is provided in the following description and claims.

DETAILED DESCRIPTION OF THE ILLUSTRATIVE EMBODIMENTS

Milk is acidified using an acidulant, preferably phosphoric acid, to achieve ph 6.0 to 6.6, preferably 6.3 to 6.5. Such acidification may also be accomplished using other food grade organic or inorganic acid, bacterial fermentation, acidogens, or other food grade substances that decrease pH. This step is called "preconditioning" and may be accomplished by using a metering pump, an inline injector, and an inline static mixer to mix a controlled amount of liquid acid with cold milk under vigorous agitation.

The preconditioned milk is pasteurized at temperatures of about 162° F. to about 195° F. for 16 seconds to 3 minutes.

The preconditioned, pasteurized milk is then cooled to 50°–112° F., depending on the cheese variety and culture used, and then inoculated with bacterial culture. The inoculated milk is then allowed to sit undisturbed as the pH drops due to bacterial fermentation. As the pH reaches the isoelectric pH of casein, a coagulum is formed which is cut and cooked to the desired firmness.

This invention is useful for several cheese varieties, but finds particular application in the production of cottage cheese curd where the curd is formed under acid conditions with adequate calcium ions present.

For cottage cheese, milk is preconditioned using a food grade acidulant, preferably phosphoric acid to pH 6.0 to 6.6, preferably 6.3 to 6.5. The preconditioned milk is pasteurized at a temperature in the range of 162° F. to 195° F. for 20–45 seconds. The preconditioned, pasteurized milk is then cooled to 85° to 95° F., preferably 88° to 92° F. The milk is then inoculated with a lactic acid producing bacterial culture at a rate of 0.1 to 3.0 percent, preferably 1.0 to 2.0 percent. A small amount of coagulating agent may be added if desired, usually 50 to 400 mL per 1000 gallons of milk preferably 100 to 300 mL per 1000 gallons skim milk ("VITEXZYME", Bunge Foods Corporation, Atlanta, GA). The milk is allowed to sit quiescently as fermentation proceeds. After a period of time, usually 2 to 6 hours, preferably 3 to 4 hours, the isoelectric pH of the casein is approached and an acid coagulum develops. When the coagulum reaches the proper firmness it is cut with harps into small cubes approximately ¼ inch square. The curds are allowed to remain undisturbed in the whey for a period of 10 to 45 minutes, preferably 20 to 30 minutes, to allow whey expulsion from the curd. Heat is then applied and gentle agitation commences. The curds and whey are cooked to the proper firmness which requires a temperature between 115° and 145° F., preferably 125° to 135° F. Cooking acid, usually phosphoric, may be added during the heating or cooking step to prevent matting of the curd.

When the proper firmness has been reached, the hot whey is drained off and water is introduced at 90° F. The curd is rinsed for 10–15 minutes and the water drained off. A second rinse at 70° F. is followed by a third rinse at 45° F. After the final rinse, the curd is trenched and allowed to drain for 30 minutes. Cream dressing is then pumped onto the curd and dispersed with agitation. The creamed curd is then packaged.

EXAMPLE 1

This example is presented to show the effects of preconditioning and heat treatment on the quality of the coagulum and final curd yield and curd quality. The pH of the raw skim was adjusted to a pH of 6.40 using a 50% (W/W) solution of phosphoric acid. The milk is then subjected to a temperature of 185° F. for 22 seconds. The milk was then cooled to 90° F. and transferred to the cheese vat. A propagated culture of lactic bacteria was added to the milk during vat filling at a rate of 2.0 percent. No coagulant was added. After the vat was full, the agitators were removed and the milk was allowed to sit undisturbed as the pH dropped to the isoelectric point of casein, usually 3 to 5 hours. As the isoelectric point of the casein was approached, the milk slowly converted into a coagulum which was cut with knives into small cubes. The cubes were allowed to settle to the bottom of the vat and remain undisturbed for 30 minutes. Heat was applied as the curds and whey were gently agitated. Cooking proceeded for two hours as the temperature was increased form 90° F. to 135° F. The whey was drained off and 90° F. water was introduced. The curds were rinsed for 15 minutes and the rinse water drained. Second and third rinses of 70° F. and 40° F. were applied and drained. The curd was trenched and allowed to drain for 30 minutes, after which cream dressing was introduced and mixed with the curd.

A control vat of cheese was made in the same manner described above except there was no preacidification of the milk to illustrate the value of such treatment.

The results of this example are presented in Table 1. They indicate that a preacidification step is advantageous for several reasons. If preacidification is not included in processing, the acid coagulum formed is weak and prone to shattering. This results in lower yields. Also, the curd derived from unproconditioned milk is mealy and lacks proper identity.

TABLE 1

| pH of the Milk Prior to Heat Treatment | Heat Treatment | Quality of Coagulum | Dry Curd Yard | Final Curd Quality |
|---|---|---|---|---|
| 6.65 | 185° F./22 sec. | poor, shattering | 15.02 | Mealy, poor identity |
| 6.40 | 185° F./22 sec. | firm, no shattering | 16.70 | Firm, resilient, good identity |

EXAMPLE 2

The effects of incubation time on curd yield were evaluated.

In one set of trials, cottage cheese curd was made from milk which had been acidified to pH 6.40 prior to heat treatment. The preconditioned milk was then heat treated to 185° F. for 22 sec., cooled to 90° F. and transferred to a cheese vat. A propagated culture of lactic bacteria was added to the vat during vat filling at a rate of 1.7 percent. No coagulant was added. After the vat the full, the agitators were removed and the vat was allowed to sit undisturbed as the pH dropped. As the isoelectric point of the casein was approached, the milk was slowly converted into a coagulum which was cut with knives into small cubes. The curds were allowed to sit undisturbed for 30 minutes. Heat was then applied as the curds and whey were gently agitated. The curds and whey were cooked for two hours until the curd reached the proper firmness. The final cook temperature was 135° F. The whey was then drained off and the curd was washed with three consecutive water rinses of 90°, 70°, and 40° F. After the final rinse, the curd was allowed to drain for 30 minutes after which cream dressing was introduced into the vat and mixed with the curd.

Dry curd yield was determined by subtracting the weight of the dressing from the total weight of finished cheese.

A second set of trials was carried out using a direct set process utilizing glucono-delta-lactose ("GDL") (available from Bunge Foods Corporation, Atlanta, GA). In this set of trails the milk was preconditioned with acid to pH 6.40, heat treated at 185° F. for 22 seconds and introduced into the vat at 90° F. as in the first set of trials. However, rather than using bacterial fermentation as the source of acid development, an acidogen (GDL) was added to the milk. GDL slowly hydrolyzes to gluconic acid and in so doing mimics the effects of fermentation, albeit in a shorter period of time, typically one hour rather than three or four. After the milk is converted to a coagulum, the curd is cut, healed, cooked, rinsed, drained and creamed as would be a fermented curd. Dry curd yield was calculated the same way as the aforementioned fermented curd yields.

The results of this example are presented in Table 2. They show the dramatic effect of fermentation time on dry curd yield. It is obvious that more curd derives from fermented milk where the curd formation is slower than that from a milk which has undergone a GCL short set where the curd formation is faster.

TABLE 2

| pH of Milk Prior to Heat Treatment | Heat Treatment | Acid Source | Fermentation Time | Dry Curd Yield |
|---|---|---|---|---|
| 6.40 | 185° F./22 sec | culture | 3.5 hours | 15.70 |
| 6.40 | 185° F./22 sec | culture | 4.2 hours | 16.12 |
| 6.40 | 185° F./22 sec | GDL | 1.0 hours | 13.91 |
| 6.40 | 185° F./22 sec | GDL | 1.1 hours | 14.21 |

EXAMPLE 3

The effects of adding acidulant to the milk after, as well as before pasteurization, were evaluated. It was particularly desired to establish the effects of a secondary "postacidification" on total solids recovered in curd derived from acid fermentation and the time and temperature required to cook the curd to proper firmness. Two experiments were carried out. The sole difference between the two trails was the "postacidification" step. In both cheesemaking trials, preacidification was to pH 6.40 and heat treatment was 185° F. for 22 seconds. Both vats were inoculated at 90° F. using 1.5% of a propagated lactic culture. No proteolytic enzyme was used in either trial. All curd was cut, healed, cooked, rinsed and dressed in similar fashion.

The results of these trials are shown in Table 3. Percent solids recovered was calculated as the percentage of the total pounds of solids present in the milk recovered in the curd.

TABLE 3

| pH of Milk Prior to Heat Treatment | Heat Treatment | Post Acidification | % Solids Rec'd | Cook Time | Cook End Temp. |
|---|---|---|---|---|---|
| 6.40 | 185° F./22 sec | None | 37.38 | 3 hr/10 min | 138° F. |
| 6.40 | 185° F./22 sec | to pH | 36.20 | 3 hr/55 | 147° F. |

TABLE 3-continued

| pH of Milk Prior to Heat Treatment | Heat Treatment | Post Acidifi- cation | % Solids Rec'd | Cook Time | Cook End Temp. |
|---|---|---|---|---|---|
| | | 6.0 | | min | |

From this data, it is obvious that no "postacidification" following heat treatment has a beneficial effect on the percent solids recovered, cook time, and cook end temperature on cheese curd made from acid coagulated milk. The percent solids recovered increases by 1.18%. On a dry curd basis this would be magnified to a 3.25% relative yield increase. Cook time and temperature are likewise beneficially affected. Reduced cook time and temperature reduces processing time, energy, and labor costs.

Although illustrative embodiments of the invention have been shown and described, however, it is to be understood that various modifications and substitutions may be made by those skilled in the art without departing from the novel spirit and scope of the present invention.

What is claimed is:

1. A method of making cheese curd consisting essentially of preconditioning milk by lowering the pH to 6.0 to 6.6 prior to heat treatment; heat treating the preconditioned milk at about 162° F. to about 195° F. for about 16 seconds to about 3 minutes; cooling the heat treated milk to about 50°-112° F.; inoculating the cooled milk with acid producing bacterial starter culture; allowing the inoculated milk to ferment undisturbed for a period of 2 to 6 hours until an acid coagulum is formed; cutting and cooking the curd.

2. The method of claim 1 wherein said preconditioning step comprises acidifying the milk to pH 6.3 to 6.5.

3. The method of claim 1 wherein said preconditioning step comprises adding a substance selected from the group consisting of phosphoric acid or an organic, inorganic, or bacterial acid present in food or mixtures thereof.

4. The method of claim 1 wherein said preconditioning step comprises agitating the milk and pumping an acidifying substance into the milk while the milk is under agitation.

5. The method of claim 1 wherein said heat treating step is carried out at a temperature form 162° F. to 195° F. for a period of approximately twenty-two seconds.

6. The method of claim 1 wherein the starter culture added comprises a lactic acid producing bacterial culture.

7. The method of claim 1 wherein the inoculated milk is allowed to ferment undisturbed until the pH reaches 4.5 to 5.1.

8. The method of claim 1 wherein a proteolytic coagulating enzyme is added to the inoculated milk.

9. A method of making cheese curd consisting essentially of selecting a milk with a pH from 6.0 to 6.6; heat treating raw milk at about 162° F. to about 195° F. for about 16 seconds to about 3 minutes; cooling the heat treated milk to about 50°-112° F.; inoculating the cooled milk with acid producing bacterial starter culture; allowing the inoculated milk to ferment undisturbed for a period of 2 to 6 hours until an acid coagulum is formed; cutting and cooking the curd.

10. The method of claim 9 wherein a proteolytic enzyme is added to the milk.

11. A method of making cottage cheese curd consisting essentially of preconditioning milk to a pH 6.0 to 6.6; heat treating the preconditioned milk at 162° F. to 195° F. for 20-45 seconds; cooling the heat treated milk to 85° F. to 95° F.; inoculating the milk with a lactic acid producing culture at a rate of 0.1 to 3.0 percent; allowing the milk to sit quiescently for a period of 2 to 6 hours until an acid coagulum forms; cutting and cooking the curd.

12. The method of claim 11 wherein a proteolytic coagulating enzyme is added to the milk.

13. The method of claim 12 wherein the proteolytic coagulating enzyme is added to a rate of 50 to 400 mL per 1000 gallons of milk.

* * * * *